US012568483B2

(12) United States Patent
Mo Song

(10) Patent No.: US 12,568,483 B2
(45) Date of Patent: Mar. 3, 2026

(54) METHOD AND A DEVICE FOR ANALYZING AND/OR VISUALIZING A WIRELESS COMMUNICATION BY A USER EQUIPMENT

(71) Applicant: Rohde & Schwarz GmbH & Co. KG, Munich (DE)

(72) Inventor: Juan Mo Song, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 390 days.

(21) Appl. No.: 18/194,955

(22) Filed: Apr. 3, 2023

(65) Prior Publication Data

US 2024/0334422 A1 Oct. 3, 2024

(51) Int. Cl.
*H04W 72/1263* (2023.01)
*H04L 5/00* (2006.01)
*H04W 72/0446* (2023.01)

(52) U.S. Cl.
CPC ....... *H04W 72/1263* (2013.01); *H04L 5/0048* (2013.01); *H04W 72/0446* (2013.01)

(58) Field of Classification Search
CPC ......... H04W 72/1263; H04W 72/0446; H04W 24/10; H04W 16/22; H04L 5/0048; H04L 5/0078; H04L 5/0053; H04L 5/0001; H04L 55/0044; H04L 43/04; H04L 43/045; H04M 1/24
See application file for complete search history.

(56) References Cited

U.S. PATENT DOCUMENTS

| | | | | |
|---|---|---|---|---|
| 11,617,099 | B2 * | 3/2023 | Chae | H04W 72/54 |
| | | | | 370/329 |
| 2017/0201991 | A1 * | 7/2017 | Pan | H04W 72/1273 |
| 2017/0367110 | A1 * | 12/2017 | Li | H04W 74/0816 |
| 2018/0083745 | A1 * | 3/2018 | Sun | H04L 5/0048 |
| 2018/0288782 | A1 * | 10/2018 | Kim | H04W 40/244 |
| 2020/0267753 | A1 * | 8/2020 | Adjakple | H04W 72/54 |
| 2020/0274656 | A1 | 8/2020 | Gordaychik | |
| 2020/0413425 | A1 | 12/2020 | Lin et al. | |
| 2022/0264475 | A1 * | 8/2022 | Yi | H04W 52/42 |
| 2023/0007504 | A1 * | 1/2023 | Jang | H04B 7/0695 |
| 2024/0340895 | A1 * | 10/2024 | Xu | H04W 72/1268 |

FOREIGN PATENT DOCUMENTS

EP 3664494 A1 * 6/2020 ......... H04W 72/541

* cited by examiner

*Primary Examiner* — Asad M Nawaz
*Assistant Examiner* — Michael Wayne Maddox
(74) *Attorney, Agent, or Firm* — Studebaker Brackett PLLC

(57) ABSTRACT

A method and a device for analyzing and/or visualizing a wireless communication by a user equipment, UE, are provided. The method includes receiving a log file which includes information on the wireless communication; and analyzing at least a part of the log file to determine: a number of uplink and/or downlink cells which were aggregated during the wireless communication, a numerology for each uplink and/or downlink cell. The numerology defines a number and/or a duration of time slots of the uplink and/or downlink cell, and a number of scheduled items of each uplink and/or downlink cell. Each scheduled item is assigned to at least one time slot of the uplink and/or downlink cell; and the method further includes displaying a scheduling view which shows the time slots of at least one of the number of uplink and/or downlink cells together with their assigned scheduled items in a graphical representation.

18 Claims, 6 Drawing Sheets

10

11 — Receiving a log file

12 — Analyzing the log file

13 — Generating and displaying a scheduling view

Figures 4A, 4B:
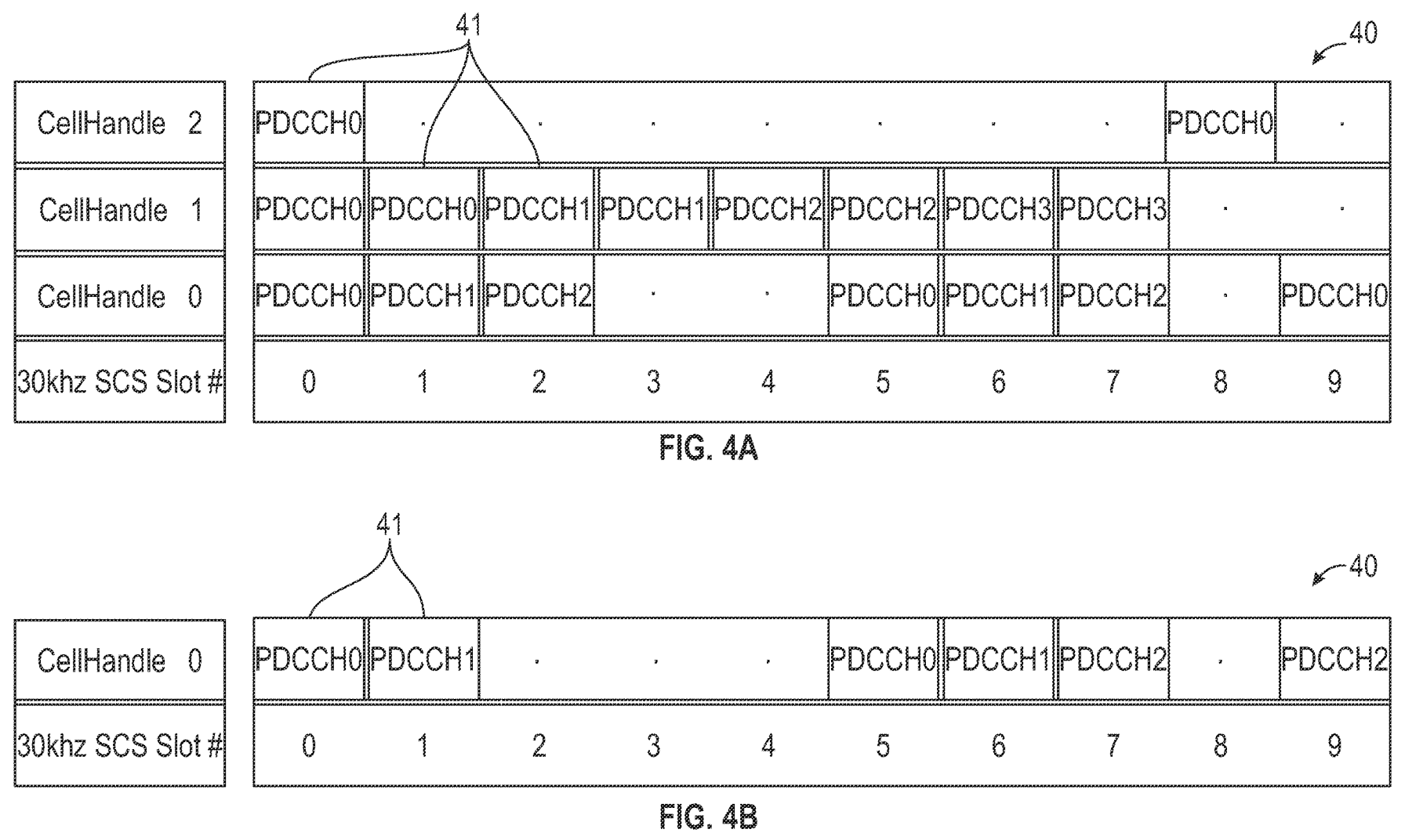

40

| CellHandle 2 | PDCCH0 | | | | | | | | PDCCH0 | |
| CellHandle 1 | PDCCH0 | PDCCH1 | | PDCCH1 | PDCCH2 | PDCCH2 | PDCCH3 | PDCCH3 | | |
| CellHandle 0 | PDCCH0 | PDCCH1 | PDCCH2 | | | PDCCH0 | PDCCH1 | PDCCH2 | | PDCCH0 |
| 30khz SCS Slot # | 0 | 1 | 2 | 3 | 4 | 5 | 6 | 7 | 8 | 9 |

| CellHandle 0 | PDCCH0 | PDCCH1 | | | | PDCCH0 | PDCCH1 | PDCCH1 | | PDCCH2 |
| 30khz SCS Slot # | 0 | 1 | 2 | 3 | 4 | 5 | 6 | 7 | 8 | 9 |

METHOD AND A DEVICE FOR ANALYZING AND/OR VISUALIZING A WIRELESS COMMUNICATION BY A USER EQUIPMENT

TECHNICAL FIELD

In general, the disclosure relates to testing of mobile networks and/or devices. More particular, the disclosure relates to a method and a device for analyzing and/or visualizing a wireless communication by a user equipment in a wireless communication network.

BACKGROUND ART

A core component of signal transmission in communication networks is the protocol stack. It encapsulates and implements all behavior, as defined by specifications, to enable a protocol for signaling data to and from a device in the network. The protocol stack comprises different layers, which are modules with own responsibilities and functionalities that interact with each other and communicate through message exchanges. These messages that are exchanged according to the protocol stack need to be scheduled.

With the arrival of 5G radio communication, the complexity of channel scheduling is substantially increased, in particular, by a flexible and user-definable spacing of control and shared channels and their respective feedback channels. In addition, increased scaling complexity from carrier-aggregation (CA) allows for many component carriers (CC) to be scheduled simultaneously.

However, this high complexity of the channel scheduling in 5G (and beyond) communication makes an analysis of the wireless communication between devices in the network, e.g. for debugging purposes, difficult and time consuming.

SUMMARY

Thus, there is a need to provide an improved method and an improved device for analyzing and/or visualizing a wireless communication by a user equipment, which avoids the above-mentioned disadvantages.

This is achieved by the embodiments provided in the enclosed independent claims. Advantageous implementations of the present disclosure are further defined in the dependent claims.

According to a first aspect, the present disclosure relates to a method for analyzing and/or visualizing a wireless communication by a user equipment, UE. The method comprise: receiving a log file which comprises information on the wireless communication. The method further comprises analyzing at least a part of the log file to determine: a number of uplink and/or downlink cells which were aggregated during the wireless communication, a numerology for each uplink and/or downlink cell, wherein the numerology defines a number and/or a duration of time slots of the uplink and/or downlink cell, and a number of scheduled items of each uplink and/or downlink cell, wherein each scheduled item is assigned to at least one time slot of the uplink and/or downlink cell. The method further comprises generating and displaying a scheduling view which shows the time slots of at least one of the number of uplink and/or downlink cells together with their assigned scheduled items in a graphical representation.

This achieves the advantage that a wireless communication between the UE and another entity can be analyzed efficiently based on a visualization of scheduling information from the log file. This graphical representation can be generated automatically when receiving the log file.

For example, the graphical representation allows to visually understand the actual scheduling of the items, which can comprise different control and shared channels. It further provides a visual feedback of what and when the network has scheduled to the UE, and when a feedback was expected. This can aid in debugging and/or in designing schedulers. It can further enable easy spotting of non-specification compliant scheduling or erroneous scheduling due to violations or bugs.

The UE can be a mobile communication device, such as a smartphone. The UE can be a device-under-test (DUT).

The wireless communication can be a communication in a wireless network, for instance a 4G, 5G or 6G network. The wireless network can be a simulated network, e.g., simulated by a network simulator.

For example, the log file is generated by the UE or by a network simulator. The log file can be or can comprise a message log. The log file can be received via a suitable communication interface.

The scheduling view can be generated based on the results of the analysis of the log file. The scheduling view can be displayed in a graphical user interface.

An uplink and/or downlink cell can correspond to an aggregated component carrier (CC). The uplink and/or downlink cells (or CCs) may operate in different numerologies. For instance, the numerology of a cell dictates a Transmit Time Interval (TTI), i.e., a frequency at which the scheduling is carried out.

For example, the numerology of a cell can be: 15 kHz, 30 kHZ, 60 kHz, 120 kHz or 240 kHz. This numerology value of a cell can determine the duration and number of time slots of the cell. Each time slot of a cell can be an uplink and/or a downlink time slot.

In an embodiment, the scheduled items of the uplink and/or downlink cells comprise: physical control channels, physical shared channels, control information, and/or reference signals.

For example, the scheduled items can comprise: downlink control information (DCI); uplink control information (UCI); channels, such as PDSCH (physical downlink shared channel), PUSCH (physical uplink shared channel), PUCCH (physical uplink control channel), PDCCH (physical downlink control channel); and/or reference signals that the control information schedules, such as CSI-RS, SRS, PT-RS, RSRP, or DMRS. Each of the DCI and/or UCI, channels and reference signals can be assigned to uplink or downlink slots, or to special flexible slots (for uplink and downlink).

In an embodiment, the method further comprises: determining scheduling information of the scheduled items of each uplink and/or downlink cell; and assigning the scheduled items to the time slots based on the scheduling information.

In an embodiment, the scheduling view comprises a table or a grid; wherein each row of the table or grid represents one of the number of uplink and/or downlink cells, and wherein the columns of the table or grid represent the time slots, wherein each scheduled item is displayed in the time slot of the uplink and/or downlink cell it is associated with.

In other words, each row (y-axis) of the table or grid can represent one of the cells, and the columns (x-axis) of the table or grid can show the time slots of the respective cells, wherein the scheduled items are shown in the time slots (e.g., each time slots can show an acronym or label which represents a scheduled item). An empty time slots (e.g., no color coding and/or labeling) can indicate that no item is scheduled for this time slot.

In an embodiment, scheduled items which are part of a scheduling chain are graphically highlighted in the scheduling view by means of a color coding and/or by graphical elements, such as arrows. This achieves the advantage that scheduled items that belong together in a scheduling process can be identified easily in the scheduling view.

For example, items in a scheduling chain can be associated with a similar (or same) color and/or an arrow that relates them to the same scheduling chain. For instance, an exemplary scheduling chain is: DCI→PDSCH→UCI.

In an embodiment, the method further comprises: receiving a first user input to select a scheduled item in the scheduling view; determining at least one further scheduled item which is associated with the selected scheduled item by a scheduling chain; and graphically highlighting the selected scheduled item and the at least one further scheduled item in the scheduling view.

For example, the first user input is a click on a scheduled item shown in the scheduling view, e.g., by means of a mouse curser or a touch input.

In an embodiment, the method further comprises: receiving a second user input to select a scheduled item in the scheduling view; and displaying information on the selected scheduled item, the information comprising a physical parameter of the selected scheduled item.

For example, the second user input is a mouse over.

In an embodiment, a content of the log file is displayed in addition to the scheduling view, wherein the scheduling view is generated dynamically for the displayed content of the log file. For example, the content of the log file can be displayed in a text-format which shows the logged events of the wireless communication in tabulated form.

For example, a user can select different contents of the log file by scrolling through the log file, wherein a new scheduling view can be generated if the scheduling changes during scrolling (e.g., when the user scrolls to a different section of the file which represents different cells). In particular, also the analysis of the part of the log file can be carried out dynamically for the selected part of the log file.

In an embodiment, the method further comprises: receiving a third user input to select a scheduled item in the scheduling view; and highlighting a message in the displayed log file which corresponds to the selected item.

In an embodiment, the scheduling view shows scheduled items which were blocked and/or rejected during the wireless communication. For instance, the items were blocked or rejected due to violation of spec or impossible physical parameters.

In an embodiment, the method further comprises: determining a grouping and/or hierarchy between the number of cells; wherein the scheduling view shows the cells according to said grouping and/or hierarchy. For example, the cells can be grouped into a master cell group and a secondary cell group.

According to a second aspect, the present disclosure relates to a device for analyzing and/or visualizing of a wireless communication by a user equipment, UE. The device comprise: an interface configured to receive a log file which comprises information on the wireless communication; and a processor configured to analyze at least a part of the log file to determine: a number of uplink and/or downlink cells which were aggregated during the wireless communication, a numerology for each uplink and/or downlink cell, wherein the numerology defines a number and/or a duration of time slots of the uplink and/or downlink cell, and a number of scheduled items of each uplink and/or downlink cell, wherein each scheduled item is assigned to at least one time slot of the uplink and/or downlink cell. The processor is further configured to generate a scheduling view which shows the time slots of at least one of the number of uplink and/or downlink cells together with their assigned scheduled items in a graphical representation. The device further comprises a display configured to display the scheduling view.

The device of the second aspect achieves the same advantages as the method of the first aspect, and may be extended by respective implementations and embodiments as described above for the method of the first aspect.

In an embodiment, the processor is configured to determining scheduling information of the scheduled items of each uplink and/or downlink cell, and to assign the scheduled items to the time slots based on the scheduling information.

In an embodiment, the display is configured to display the scheduled view as a table or a grid; wherein each row of the table or grid represents one of the number of uplink and/or downlink cells, and wherein the columns of the table or grid represent the time slots, wherein each scheduled item is displayed in the time slot of the uplink and/or downlink cell it is associated with.

In an embodiment, the display is configured to graphically highlight scheduled items in the scheduling view which are part of a scheduling chain by means of a color coding and/or by graphical elements, such as arrows.

In an embodiment, the device further comprises a user interface configured to receiving a user input to select a displayed scheduled item of a cell.

In an embodiment, if the user input is a first user input, the processor is configured to determine at least one further scheduled item which is associated with the selected scheduled item by a scheduling chain, and the display is configured to graphically highlight the selected scheduled item and the at least one further scheduled item in the scheduling view.

In an embodiment, if the user input is a second user input, the display is configured to display information on the selected scheduled item, the information comprising a physical parameter of the selected scheduled item.

In an embodiment, the processor is configured to determine a grouping and/or hierarchy between the number of cells; wherein the display is configured to display the scheduling view to show the cells according to said grouping and/or hierarchy.

The device according to the second aspect of the disclosure can be configured to carry out the method according to the first aspect of the disclosure.

BRIEF DESCRIPTION OF THE DRAWINGS

The above-described aspects and implementation forms of the present disclosure will be explained in the following description of specific embodiments in relation to the enclosed drawings, in which:

FIGS. 4A-B show scheduling views of a wireless communication according to an embodiment.

DETAILED DESCRIPTIONS OF EMBODIMENTS

Figure 1:
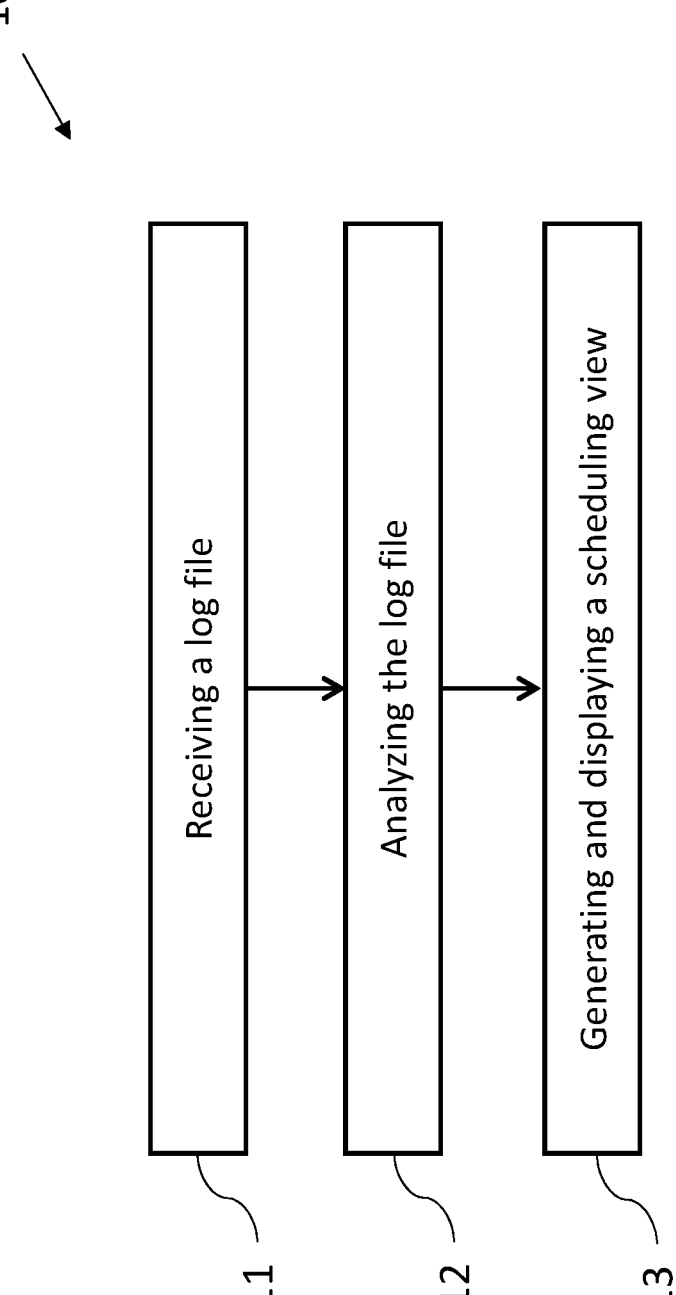
FIG. 1 shows steps of a method for analyzing and/or visualizing a wireless communication by a UE according to an embodiment.

FIG. 1 shows steps of a method 10 for analyzing and/or visualizing a wireless communication by a UE according to an embodiment.

The method 10 comprises the steps of: receiving 11 a log file which comprises information on the wireless communication by the UE; and analyzing 12 at least a part of the log file to determine: a number of uplink and/or downlink cells which were aggregated during the wireless communication, a numerology for each uplink and/or downlink cell, wherein the numerology defines a number and/or a duration of time slots of the uplink and/or downlink cell, and a number of scheduled items of each uplink and/or downlink cell, wherein each scheduled item is assigned to at least one time slot of the uplink and/or downlink cell. The method 10 comprises the further step of: generating and displaying 13 a scheduling view which shows the time slots of at least one of the number of uplink and/or downlink cells together with their assigned scheduled items in a graphical representation.

The log file can comprise a plurality of messages which were received and/or transmitted by the UE during the wireless communication. These messages can be logged in the log file, which is e.g. a binary file. The scheduling view visualizes contents of this log file and can be displayed in a graphical user interface (GUI).

The scheduling view can facilitate an analysis of the log file to better understand the behavior and operation within the protocol stack, and to know what was being scheduled to the UE. In particular, the scheduling view can be generated automatically based on the log file without requiring any user input or a manual sketching of the scheduling.

For instance, the UE is a device-under-test (DUT). The wireless communication can be a communication with another entity in a wireless communication network, e.g. a 4G, 5G or 6G network. The wireless communication network and/or the other entity can be simulated, e.g., by a network simulator.

The scheduled items of the uplink and/or downlink cells can comprise: control information, such as DCI or UCI; channels, such as PDSCH, PUSCH, PUCCH, PDCCH; and/or reference signals, such as CSI-RS, SRS, PT-RS, RSRP, DMRS. Each of those items may be represented in upload and/or download time slots or in special flexible time slots.

Figure 2:
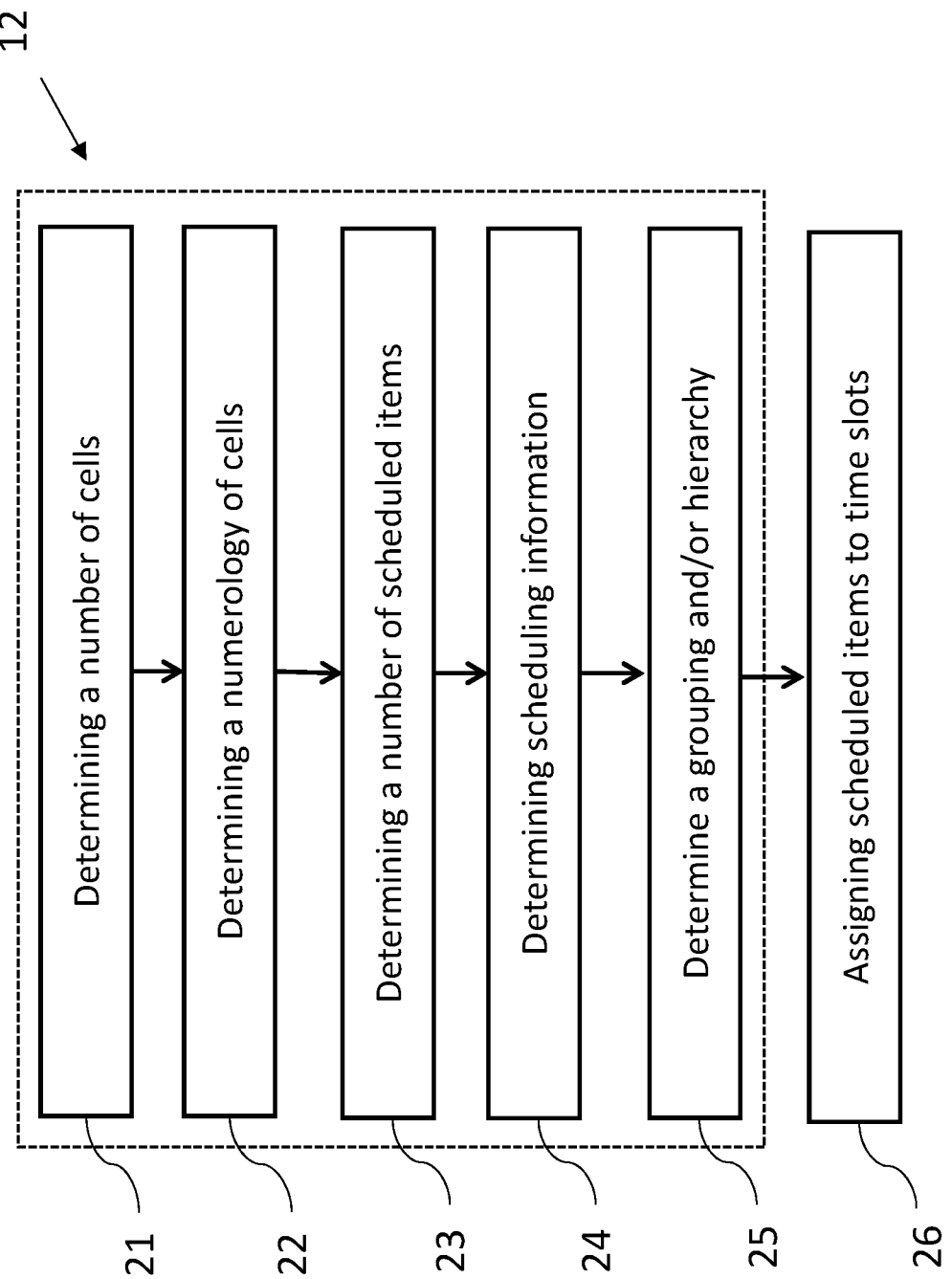
FIG. 2 shows steps of a method for analyzing and/or visualizing a wireless communication by a UE according to an embodiment.

FIG. 2 shows further steps of the method 10 according to an embodiment. In particular, FIG. 2 shows that the step of analyzing 12 the log file can comprise: determining 21 the number of uplink and/or downlink cells, determining 22 the numerology of each uplink and/or downlink cell, determining 23 the number of scheduled items of each uplink and/or downlink cell, and further determining 24 scheduling information of the scheduled items of each uplink and/or downlink cell. The scheduling information can be information on a position of each item in a scheduling chain.

The step of analyzing 12 the log file may further comprise: determining 25 a grouping and/or hierarchy between the number of uplink and/or downlink cells. For example, the scheduling view can show the uplink and/or downlink cells according to said grouping and/or hierarchy.

The method 10 may comprise the further step of assigning 26 the scheduled items to the time slots based on the scheduling information. The scheduling view can be generated and displayed based on said assignment 26.

Figure 3:
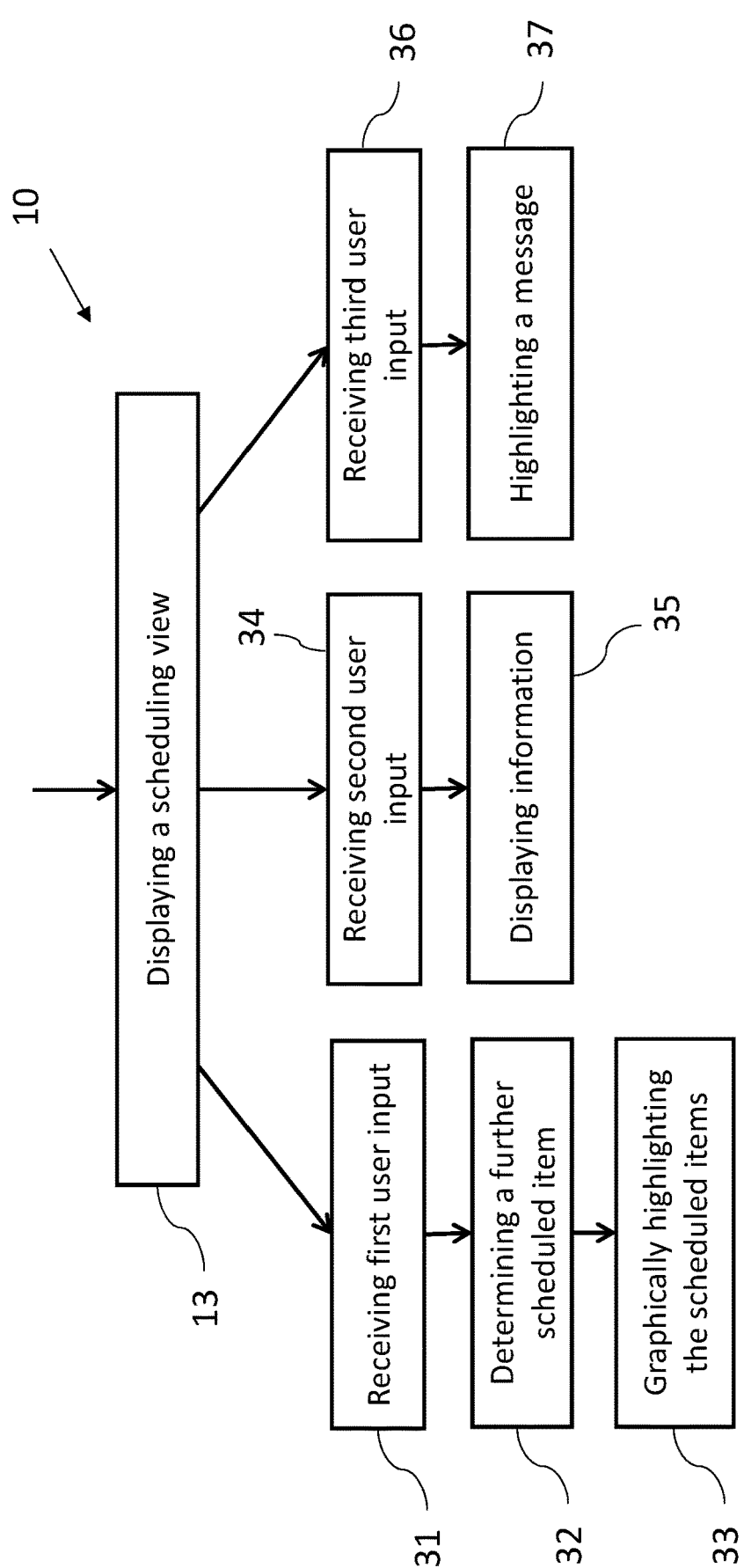
FIG. 3 shows steps of a method for analyzing and/or visualizing a wireless communication by a UE according to an embodiment.
Figure 5:
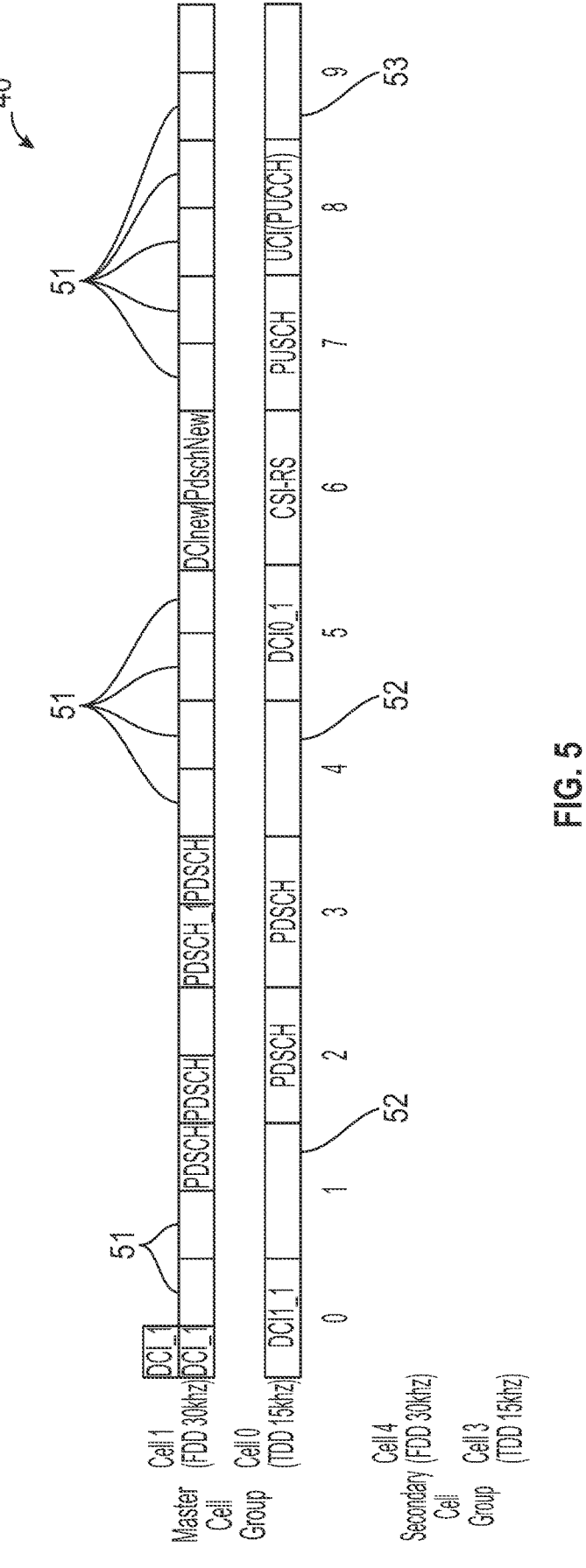
FIG. 5 shows a scheduling view of a wireless communication according to an embodiment.

FIG. 3 shows further steps of the method 10 according to an embodiment. In particular, FIG. 3 shows that the method 10 can comprise receiving different user input on the displayed items in the scheduling view. This user inputs can be received via a user interface. The user interface can be a GUI, wherein the scheduling view is displayed in the GUI. FIGS. 4A-B and FIG. 5 show possible scheduling views 40 which are suitable for being displayed in such a GUI. In these examples, the time slots 41 with the scheduled items are displayed as boxes of a certain size.

For example, the method 10 comprises: receiving 31 a first user input to select a scheduled item in the scheduling view 40; determining 32 at least one further scheduled item which is associated with the selected scheduled item by a scheduling chain; and graphically 33 highlighting the selected scheduled item and the at least one further scheduled item in the scheduling view. The first user input can be a clicking (via mouse cursor or finger) on a displayed scheduled item.

The method 10 may further comprise the steps of: receiving 34 a second user input to select a scheduled item in the scheduling view; and displaying 35 information on the selected scheduled item, the information comprising a physical parameter of the selected scheduled item. For instance, the second user input can be a mouse over. For example, if a "mouse over" over displayed a scheduled item, more info of essential scheduled physical parameters can be shown.

Furthermore, a content of the log file can displayed in addition to the scheduling view 40, wherein the scheduling view 40 can be generated dynamically for the displayed content of the log file. For example, the content of the log file can be displayed in a text-format and can show the logged events, e.g., messages of the wireless communication. For instance, if a scheduled item (e.g. a box in the scheduling view 40) is selected via a third user input (step 36), the corresponding message in the displayed log file is highlighted (step 37). The third user input could be a double-click or double-tab. The third user input can also be identical to the first user input, and in response to said user input both the items in the scheduling chain are highlighted and the messages in the log file are highlighted.

For instance, in the log file, messages can be organized in a tabulated form, e.g., each message is represented in a row and each column shows a user-defined content from the message (in text form). The log file can be a list in which each message is timestamped, and the messages are shown from top to bottom according to their timestamp. However, although the messages' full content is available, the log file does not visually represent or portrait a channel type, a scheduling time, and control feedback that a specific messages is meant to schedule. The generated scheduling view 40 can show all of this information in an easy to understand visual representation. This makes analysis of the log file, e.g. for debugging, much easier and time saving. In particular, the scheduling view 40 allows a user to quickly and visually identify scheduling patterns from the log file.

FIGS. 4A-B show scheduling views 40 of the wireless communication according to an embodiment.

The scheduling view 4 in FIGS. 4A-B is a table or a grid of boxes. For instance, each row of the table or grid represents one cell of the number of the cells, and the boxes in the columns of the table or grid represent the time slots 41, wherein each scheduled item of a cell can be displayed in the time slot 41 of the cell it is associated with. In other words, each box shows what the network has scheduled at that time. For example, a short descriptor, an acronym or a label of the scheduled item can be written in each box.

In the grid shown in FIGS. 4A and 4B, the x-axis can represent a NR (numerology) protocol time and the Y axis can show the number of a cell or CC (labeled here as CellHandle). Each cell in the scheduling view 40 can be a serving cell. Furthermore, each cell or CC can be in a row of the y-axis. As such, the scheduling view 40 can extend and scroll horizontally, as the NR protocol time increases. The vertical axis can accommodate each of the cells or CCs that is configured. The cells respectively CCs can be active or inactive, shown by whether or not scheduling exists for that cell or CC.

For each cell or CC, a scheduled item, e.g., a scheduled control or shared channel (uplink or downlink) can be represented by a box, which can be named and color-coded. The color codes can be extended in such a way that they show whether the channel is an uplink (UL) or downlink (DL) channel, a control or shared channel, and/or which cell or CC the channel is associated with. These boxes 41 can be placed on the y-axis corresponding to the cell or CC, and on the x-axis corresponding to the NR protocol time at which they are scheduled. Thus, each color coded box can represent a time slot 41 at which an item of a cell can be scheduled.

Each scheduled item in a box can be related to another item in a scheduling chain. This can be shown by an arrow connecting the boxes or by a color coding in the scheduling view 40. Protocol times where no scheduling happened can be filled with placeholder boxes to maintain visual consistency. Furthermore, scheduled items which were blocked and/or rejected during the wireless communication can also be shown in the scheduling view (e.g., with a special color coding). The spacing of the boxes can represent specification standard parameters used for the scheduling.

For example, the scheduling view 40 in FIG. 4A comprises three aggregated cells and the scheduling view in FIG. 4B shows a single cell.

In the scheduling view in FIG. 4B, PDCCH0 (Physical Downlink Control Channel 0) is scheduled in slot No. 0 which in turn schedules a PDSCH0 (Physical Downlink Shared Channel 0) in slot No. 5. Visually, the scheduling view 40 shows a distance of 5 slots between these items, which means K0* is 5 slots (K0* is a specification defined parameter of distance in slots between a DCI and the PDSCH it schedules).

Typically, a PDSCH0, requires a feedback. In the example of FIG. 4B, this feedback is in the PUSCH2 (Physical Uplink Shared Channel 2). The next PDCCH2 in FIG. 4B is scheduled in slot 7, which schedules a PUSCH2 in slot 9. This means that K1* (a specification defined parameter of distance in slots between the PDSCH and its feedback) is 4 slots. Since it's the only UL channel scheduled, it is implied that the Harq (Hybrid-Automatic Repeat Request) feedback from the PDSCH goes in this PUSCH2*. For example, arrows could be drawn to visually connect the items that belong to a scheduling chain. Again it can be seen visually that K2* (a specification defined parameter of distance in slots between the DCI and the PUSCH scheduled by the DCI) is 2 slots.

For example, if PDCCH0 (in the first slot of FIG. 4B) is clicked or tapped, dependent scheduled items of the same scheduling chain can be highlighted (here: slot 5 PDSCH0 and slot 9 PUCCH0).

Moreover, the y-axis of the scheduling view of FIGS. 4A-B can represent a time axis, wherein the items in the time slots 41 (represented as boxes) are sequentially scheduled from left to right. The position of the boxes on the y-axis may represent a certain scheduling time. Items of different cells can be scheduled simultaneously (for the same time) if they are on the same y-axis position. E.g., the items of the three cells in FIG. 4A which are shown in time slot no. 1 can be scheduled simultaneously. The length and the spacing of the boxes in y-direction can represent a duration and a temporal spacing of the scheduled items in the boxes.

FIG. 4A shows how the scheduling view can scale in multi cell, respectively multi CC, cases. The exemplary scheduling view 40 in FIG. 4A shows an example where all cells (respectively CCs) have the same numerology (in terms of frequency) and, thus, the same slot sizes, but this is not necessarily always the case. In principle, the numerology dictates the Transmit Time Interval (TTI) of the cell and, thus, the frequency at which scheduling happens. In frequency domain, different numerologies may correspond to different sub-carrier spacings. In FIGS. 4A and 4B the frequency is 30 kHz for all time slots of all cells.

FIG. 5 shows another example of a scheduling view 40 with two cells which have different numerologies and, thus, different slot sizes for each cell. The cell 1 in FIG. 1A is a FDD (frequency division duplex) cell with a frequency of 30 kHz and cell 0 is a TDD (time division duplex) cell with a frequency of 15 kHz. The duration of the time slot of the 15 kHz cell are half the duration of the time slots of the 30 kHz cell.

For example, at a numerology frequency of 15 kHz, there are 10 time slots in a frame, wherein each time slot has a duration of 1 ms. The size of the boxes in the scheduling view can depend on this numerology value. For instance, the boxes in the scheduling view 40 for cell 0 at 15 kHz have double the length (i.e., double the duration) of the box of cell 1 at 30 kHz.

The time slots of the FDD and TDD cells can be color coded, e.g., with different background colors. Further (background) colors could be used to differentiate DL, UL and Flex slots, e.g., green for FDD slots, blue for DL slots, red for flex slots and yellow for UL slots. Scheduled items within a scheduling chain can be further color coded, e.g., by a bright or a dark highlighting of the respective colors. The scheduling view 40 can comprise a legend which explains the color coding and/or the acronyms respectively labels used in the scheduling view 40.

The cells in FIG. 5 further comprise a number of empty time slots, i.e., time slots for which no item is scheduled. For instance, cell 1 comprises a number of empty FDD slots 51 and cell 0 comprises two empty DL slots 52 (at slot position 1 and 4) and an empty UL slot 53 (at slot position 9). An example for empty flex slots is not shown in FIG. 5.

FIG. 5 further shows that more than one item can be associated with a time slot. For instance, time slot No. 1 of cell 1 shows two DCI1_1 (downlink control information for DL SH) items. A downlink control information for a UL (uplink) SH would be labeled: DCI0_1 in this scheduling view 40, but is not shown in FIG. 5.

Furthermore, FIG. 5 shows that the cells can be grouped according to a hierarchy. The two top cells (cell 1 and cell 0) in FIG. 5 are master cells and the two bottom cells (cell 4 and cell 3) are secondary cells.

Since the scheduling view 40 does not show the entire content of the log file, clicking on a box can cause a corresponding message in the log file that is associated with the box to be highlighted. Therefore, the log file (or contents of the log file) can be displayed in a text format together with the scheduling view. The boxes in the same scheduling chain can further be highlighted, e.g., when focusing on one of the items in a scheduling chain (e.g., by a mouse over).

The scheduling view 40 can enable users to effectively and efficiently understand the actual physical channel scheduling. This can help visually identify non-specification compliant scheduling and violations, debug issues related to scheduling, and aid in designing schedulers. This can also help to directly understand specification related scheduling and/or dynamic parameters of the scheduling.

Figure 6:
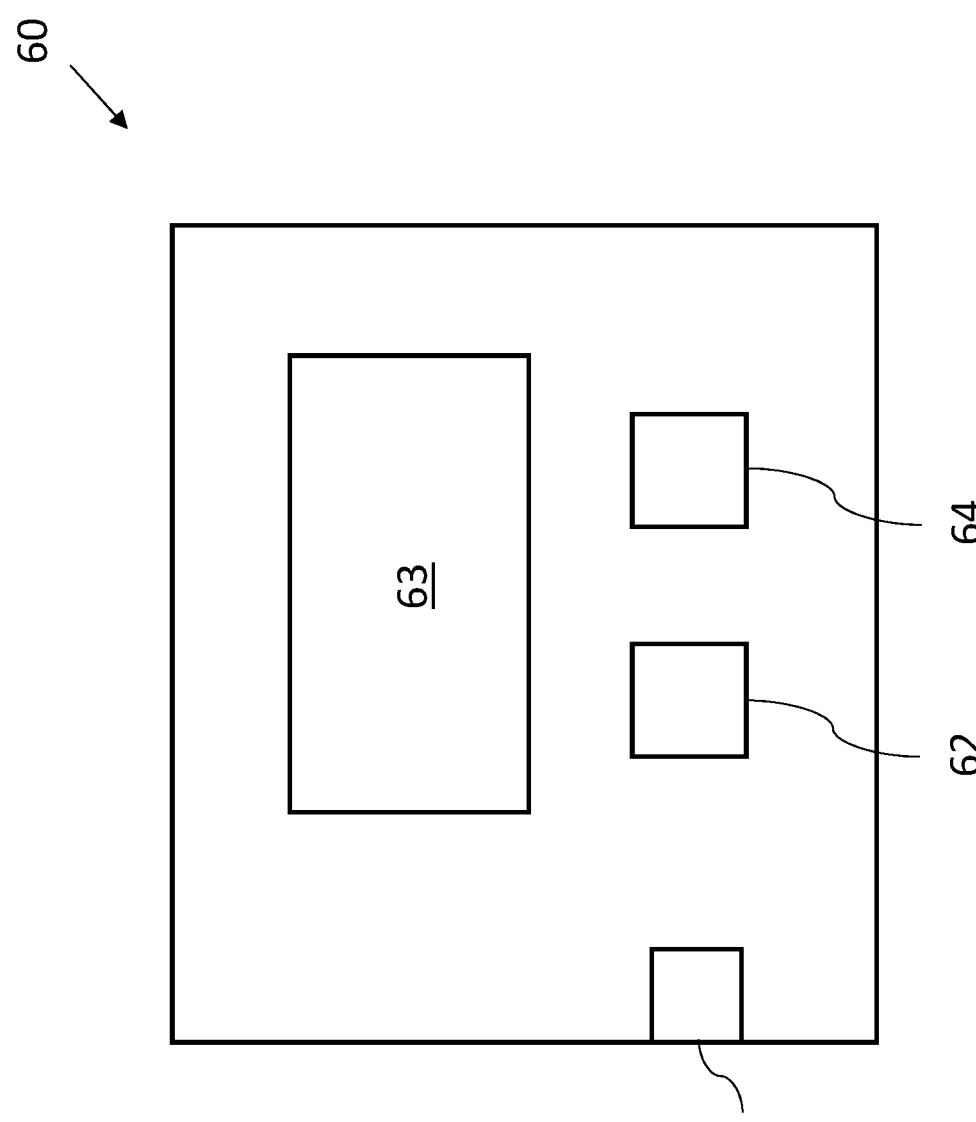
FIG. 6 shows a schematic diagram of a device for analyzing and/or visualizing a wireless communication by a UE according to an embodiment.

FIG. 6 shows a schematic diagram of a device 60 for analyzing and/or visualizing the wireless communication by the UE according to an embodiment. The device 60 can be configured to carry out the method 10 as shown in any one of FIGS. 1-3.

The device 60 comprises: an interface 61 configured to receive the log file which comprises information on the wireless communication by the UE; and a processor 62 configured to analyze at least a part of the log file to determine: a number of uplink and/or downlink cells which were aggregated during the wireless communication, a numerology for each uplink and/or downlink cell, wherein the numerology defines the number and/or a duration of time slots of the uplink and/or downlink cell, and a number of scheduled items of each uplink and/or downlink cell, wherein each scheduled item is assigned to at least one time slot of the uplink and/or downlink cell. The processor 62 is further configured to generate the scheduling view which shows the time slots of at least one of the number of uplink and/or downlink cells together with their assigned scheduled items in a graphical representation. A display 63 of the device is configured to display the, thus, generated scheduling view.

For example, the processor 62 is configured to determine the scheduling information of the scheduled items of each uplink and/or downlink cell, and to assign the scheduled items to the time slots based on the scheduling information.

The device 60 can be a test device for UEs, such as smartphones or other wireless communication devices. For example, the device 60 can be a mobile network tester or a part thereof.

The processor 62 can be a microprocessor. The interface 61 can be any wire-bound or wireless interface suitable to receive data files, e.g. a USB interface.

The display 63 can be configured to display the scheduling view as a table or a grid, e.g., as shown in FIGS. 4A-B or FIG. 5, and to graphically highlight scheduled items in the scheduling view if they are part of a scheduling chain. For example, the items can be highlighted by means of a color coding and/or by graphical elements, such as arrows The display 63 can be configured to display contents of the log file, e.g. in a text format, in addition to the scheduling view 40.

The device 60 can comprise a user interface 64 which is configured to receiving a user input to select a displayed scheduled item of a cell. For instance, the user interface 64 could be a graphical user interface (GUI) which is displayed by the display 63 and which allows a user interaction with the displayed scheduling view 40. For instance, the display 63 is a touch-sensitive display (touchscreen) which is configured to receive the user input via touch gestures.

The user interface 64 can be configured to receive the first, the second and/or the third user input, wherein, in response, the display 63 can highlight items in a scheduling chain, show information about the selected item, and/or highlight a corresponding message in the displayed log file, respectively.

The processor 62 can further be configured to determine a grouping and/or hierarchy between the number of cells, and the display 63 can be configured to display the scheduling view to show the cells according to said grouping and/or hierarchy.

The device 60 can be configured to automatically generate the scheduling view 40 based on the log file. Thus, no manual sketching of the scheduling in the log file is necessary. This can improve usability and increase an efficiency of log analysis. The graphical representation allows understanding of the actual DUT scheduling.

All features described above or features shown in the figures can be combined with each other in any advantageous manner within the scope of the disclosure.

The invention claimed is:

1. A method for analyzing or visualizing a wireless communication by a user equipment, UE, the method comprising:

receiving a log file which comprises information on the wireless communication;

analyzing at least a part of the log file to determine:

a number of at least one of uplink and downlink cells which were aggregated during the wireless communication, a numerology for each uplink or downlink cell, wherein the numerology defines a number or a duration of time slots of the uplink or downlink cell, a number of scheduled items of each uplink or downlink cell, wherein each scheduled item is assigned to at least one time slot of the uplink or downlink cell; and generating and displaying a scheduling view which shows the time slots of at least one of the number of at least one of uplink and downlink cells together with their assigned scheduled items in a graphical representation, wherein scheduled items which are part of a scheduling chain are graphically highlighted in the scheduling view by means of at least one of color coding and graphical elements.

2. The method of claim 1, wherein the scheduled items of the uplink or downlink cells comprise: at least one of physical control channels, physical shared channels, control information, and reference signals.

3. The method of claim 1, further comprising:

determining scheduling information of the scheduled items of each uplink or downlink cell; and assigning the scheduled items to the time slots based on the scheduling information.

4. The method of claim 1, wherein the scheduling view comprises as a table or a grid;

wherein each row of the table or grid represents one of the number of at least one of uplink and downlink cells, and wherein columns of the table or grid represent the time slots, wherein each scheduled item is displayed in the time slot of the uplink or downlink cell it is associated with.

5. The method of claim 1,
wherein scheduled items which are part of the scheduling chain are graphically highlighted in the scheduling view by arrows.

6. The method of claim 1, further comprising:
receiving a first user input to select a scheduled item in the scheduling view;
determining at least one further scheduled item which is associated with the selected scheduled item by a scheduling chain; and
graphically highlighting the selected scheduled item and the at least one further scheduled item in the scheduling view.

7. The method of claim 1, further comprising:
receiving a second user input to select a scheduled item in the scheduling view; and
displaying information on the selected scheduled item, the information comprising a physical parameter of the selected scheduled item.

8. The method of claim 1,
wherein a content of the log file is displayed in addition to the scheduling view, and
wherein the scheduling view is generated dynamically for the displayed content of the log file.

9. The method of claim 8, wherein the method further comprises:
receiving a third user input to select a scheduled item in the scheduling view; and
highlighting a message in the displayed log file which corresponds to the selected item.

10. The method of claim 1,
wherein the scheduling view shows scheduled items which were blocked or rejected during the wireless communication.

11. The method of claim 1; further comprising:
determining a grouping or hierarchy between the number of cells;
wherein the scheduling view shows the cells according to said grouping or hierarchy.

12. A device for analyzing or visualizing of a wireless communication by a user equipment, UE, the device comprising:
an interface configured to receive a log file which comprises information on the wireless communication;
a processor configured to analyze at least a part of the log file to determine:
a number of at least one of uplink and downlink cells which were aggregated during the wireless communication, a numerology for each uplink or downlink cell, wherein the numerology defines a number or a duration of time slots of the uplink or downlink cell,
a number of scheduled items of each uplink or downlink cell, wherein each scheduled item is assigned to at least one time slot of the uplink or downlink cell;
wherein the processor is configured to generate a scheduling view which shows the time slots of at least one of the number of at least one of uplink and downlink cells together with their assigned scheduled items in a graphical representation; and
a display which is configured display the scheduling view, wherein the display is configured to graphically highlight scheduled items in the scheduling view which are part of a scheduling chain by means of at least one of color coding and graphical elements.

13. The device of claim 12,
wherein the processor is configured to determining scheduling information of the scheduled items of each uplink or downlink cell, and to assign the scheduled items to the time slots based on the scheduling information.

14. The device of claim 12,
wherein the display is configured to graphically highlight scheduled items in the scheduling view which are part of the scheduling chain by arrows.

15. The device of claim 12, further comprising:
a user interface configured to receiving a user input to select a displayed scheduled item of a cell.

16. The device of claim 15,
wherein, if the user input is a first user input, the processor is configured to determine at least one further scheduled item which is associated with the selected scheduled item by a scheduling chain, and the display is configured to graphically highlight the selected scheduled item and the at least one further scheduled item in the scheduling view.

17. The device of claim 15,
wherein, if the user input is a second user input, the display is configured to display information on the selected scheduled item, the information comprising a physical parameter of the selected scheduled item.

18. The device of claim 12,
wherein the processor is configured to determine a grouping or hierarchy between the number of cells;
wherein the display is configured to display the scheduling view to show the cells according to said grouping or hierarchy.

* * * * *